US010366254B2

(12) United States Patent
Bovee

(10) Patent No.: US 10,366,254 B2
(45) Date of Patent: Jul. 30, 2019

(54) AUTHORIZATION FOR TRANSIENT STORAGE DEVICES WITH MULTIPLE AUTHENTICATION SILOS

(71) Applicant: MICROSOFT TECHNOLOGY LICENSING, LLC, Redmond, WA (US)

(72) Inventor: James Bovee, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 576 days.

(21) Appl. No.: 14/810,815

(22) Filed: Jul. 28, 2015

(65) Prior Publication Data

US 2015/0332068 A1    Nov. 19, 2015

Related U.S. Application Data

(62) Division of application No. 12/146,066, filed on Jun. 25, 2008, now Pat. No. 9,122,895.

(51) Int. Cl.
  G06F 21/79    (2013.01)
  G06F 21/78    (2013.01)
  (Continued)

(52) U.S. Cl.
  CPC ........... G06F 21/79 (2013.01); G06F 21/32 (2013.01); G06F 21/33 (2013.01); G06F 21/77 (2013.01); G06F 21/78 (2013.01)

(58) Field of Classification Search
  CPC ................................ G06F 19/3443; G06F 21/79
  See application file for complete search history.

(56) References Cited

U.S. PATENT DOCUMENTS 5,455,958 A    10/1995    Flurry et al.
5,913,227 A    6/1999    Raz et al.
(Continued)

FOREIGN PATENT DOCUMENTS

JP    H0935030 A    2/1997
JP    H1165938 A    3/1999
(Continued)

OTHER PUBLICATIONS

Donald Rich, "Authentication in Transient Storage Device Attachments," Apr. 2007.*

(Continued)

*Primary Examiner* — Andrew C Georgandellis
(74) *Attorney, Agent, or Firm* — Workman Nydegger

(57) ABSTRACT

In a transient storage device (TSD) with multiple authentication silos, a host computing device connected to the TSD is configured by the TSD to discover and act upon various types of authentication information in the silos. One or more logical combinations of authentication silos are switched to the authenticated state to grant access to an associated storage area. A particular ordering of authentication silos may be required to achieve a valid combination of authenticated silos. Ordering may be suggested by configuration information in the TSD. Ordering may also be based upon whether or not user input is required for authenticating a given authentication silo, the environment of use of the TSD, or a hierarchy from most trusted to least trusted authentication silo. With this information, the host proceeds with the most efficient authentication sequence leading to a grant of access to the storage area.

20 Claims, 5 Drawing Sheets

(51) Int. Cl.
G06F 21/77 (2013.01)
G06F 21/33 (2013.01)
G06F 21/32 (2013.01)

(56) References Cited

U.S. PATENT DOCUMENTS

| | | | |
|---|---|---|---|
| 6,260,120 B1 | 7/2001 | Blumenau et al. | |
| 6,751,702 B1 | 6/2004 | Hsieh et al. | |
| 6,792,424 B1 | 9/2004 | Burns et al. | |
| 7,086,085 B1 | 8/2006 | Brown et al. | |
| 7,165,152 B2 | 1/2007 | Blumenau et al. | |
| 7,257,835 B2 | 8/2007 | Jones | |
| 7,325,097 B1 | 1/2008 | Darcy | |
| 2004/0039909 A1* | 2/2004 | Cheng | G06F 21/32 713/169 |
| 2004/0068652 A1 | 4/2004 | Carpentier et al. | |
| 2005/0177724 A1* | 8/2005 | Ali | G06F 21/31 713/168 |
| 2006/0089126 A1* | 4/2006 | Frank | H04L 63/08 455/411 |
| 2006/0224623 A1 | 10/2006 | Graziadio et al. | |
| 2006/0224736 A1 | 10/2006 | Graziado et al. | |
| 2006/0282671 A1 | 12/2006 | Burton | |
| 2007/0061566 A1 | 3/2007 | Bailey et al. | |
| 2007/0061571 A1 | 3/2007 | Hammes et al. | |
| 2007/0067642 A1* | 3/2007 | Singhal | G06F 21/32 713/186 |
| 2007/0208823 A1 | 9/2007 | Shannon et al. | |
| 2007/0245153 A1 | 10/2007 | Richtsmeier et al. | |
| 2007/0250915 A1 | 10/2007 | Thibadeau | |

FOREIGN PATENT DOCUMENTS

| | | |
|---|---|---|
| JP | 2003143136 A | 5/2003 |
| JP | 2003248662 A | 9/2003 |

OTHER PUBLICATIONS

"IEEE Standard Protocol for Authentication in Host Attachments of Transient Storage Devices," Jun. 6, 2007.*
"IEEE Standard Protocol for Authentication in Host Attachments of Transient Storage Devices", In IEEE Std 1667-2006, Jun. 6, 2007, 59 Pages.
Thain, et al., "The Consequences of Decentralized Security in a Cooperative Storage System", In Proceedings of the 3rd International Security in Storage Workshop, Dec. 13, 2005, 13 pages.
Peschka, Steve, "Microsoft SharePoint Products and Technologies Team Blog", Retrieved from <<http://blogs.msdn.com/sharepoint/archive/2006/08/16/configuring-multiple-authentication-providers-for-sharepoint-2007.aspx>>, 2006, 17 pages.
"Office Action Issued in European Patent Application No. 09770617.0", dated Dec. 12, 2012, 5 pages.
"Communication Issued in European Patent Application No. 09770617.0", dated Sep. 22, 2011, 1 Page.
"Search Report Issued in European Patent Application No. 09770617.0", dated Sep. 5, 2011, 8 Pages.
"Response to Communication Filed in European Patent Application No. 09770617.0", Filed Date: Apr. 17, 2013, 8 Pages.
"Response to Communication Filed in European Patent Application No. 09770617.0", Filed Date: Jan. 18, 2012, 14 Pages.
"Notice of Allowance Issued in Korean Patent Application No. 10-2010-7028858", dated Dec. 29, 2015, 2 Pages. (W/O English Translation).
"Office Action Issued in Korean Patent Application No. 10-2010-7028858", dated May 27, 2015, 9 Pages.
"Final Office Action Issued in U.S. Appl. No. 12/146,066", dated Jul. 13, 2011, 10 Pages.
"Non-Final Office Action Issued in U.S. Appl. No. 12/146,066", dated Feb. 16, 2011, 9 Pages.
"Fourth Office Action Issued in Chinese Patent Application No. 200980124786.5", dated Jul. 31, 2014, 7 Pages.
"Notice of Allowance Issued in Chinese Patent Application No. 200980124786.5", dated Dec. 23, 2014, 4 Pages.
"First Office Action Issued in Chinese Patent Application No. 200980124786.5", dated Dec. 13, 2012, 11 Pages.
"Second Office Action Issued in Chinese Patent Application No. 200980124786.5", dated Aug. 1, 2013, 7 Pages.
"Third Office Action Issued in Chinese Patent Application No. 200980124786.5", dated Jan. 22, 2014, 14 Pages.
"Notice of Allowance Issued in Japanese Patent Application No. 2011-516375", dated Jul. 8, 2014, 4 Pages.
"Office Action Issued in Japanese Patent Application No. 2011-516375", dated Mar. 24, 2014, 4 Pages.
"Office Action Issued in Japanese Patent Application No. 2011-516375", dated Sep. 3, 2013, 5 Pages. (W/O English Translation).
"International Preliminary Report on Patentability Issued in PCT Application No. PCT/US2009/044655", dated Jan. 5, 2011, 4 Pages.
"International Search Report and Written Opinion Issued in PCT Application No. PCT/US2009/044655", dated Nov. 26, 2009, 10 Pages.
Rich, Donald , "Authentication in Transient Storage Device Attachments", In Journal on Computer, vol. 40, Issue 4, Apr. 2007, pp. 102-104.
Samar, et al., "Unified Login with Pluggable Authentication Modules (PAM)", vol. OSF-RFC 68.0, Oct. 1, 1995, 19 Pages.
Office Action dated Sep. 24, 2014 cited in U.S. Appl. No. 12/146,066.
Notice of Allowance dated Apr. 24, 2015 cited in U.S. Appl. No. 12/146,066.
"First Office Action Issued in Indian Patent Application No. 8226/CHENP/2010", dated Feb. 23, 2018, 7 Pages.

* cited by examiner

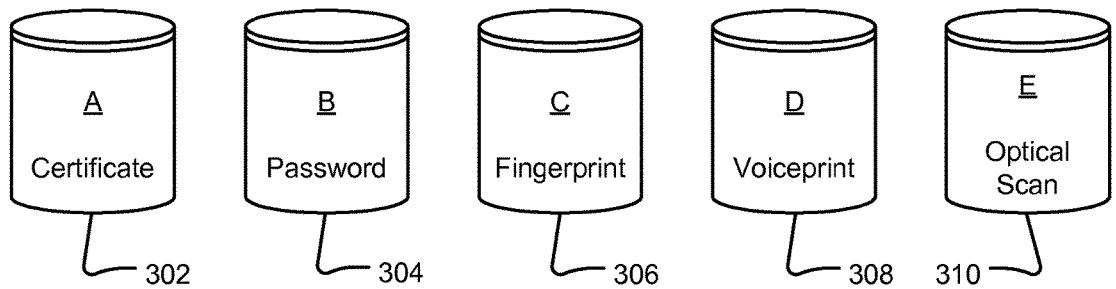
Fig. 3A
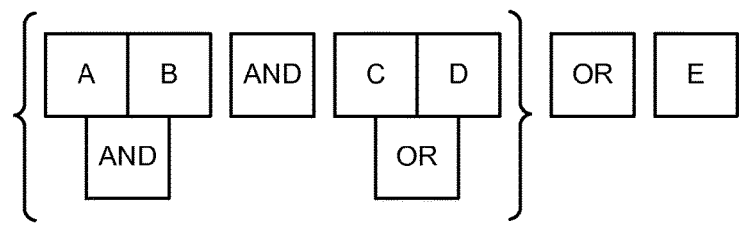
Fig. 3B
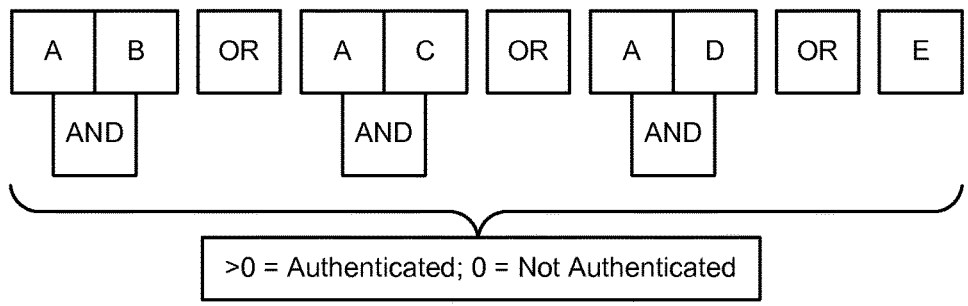
Fig. 3C
Fig. 3D

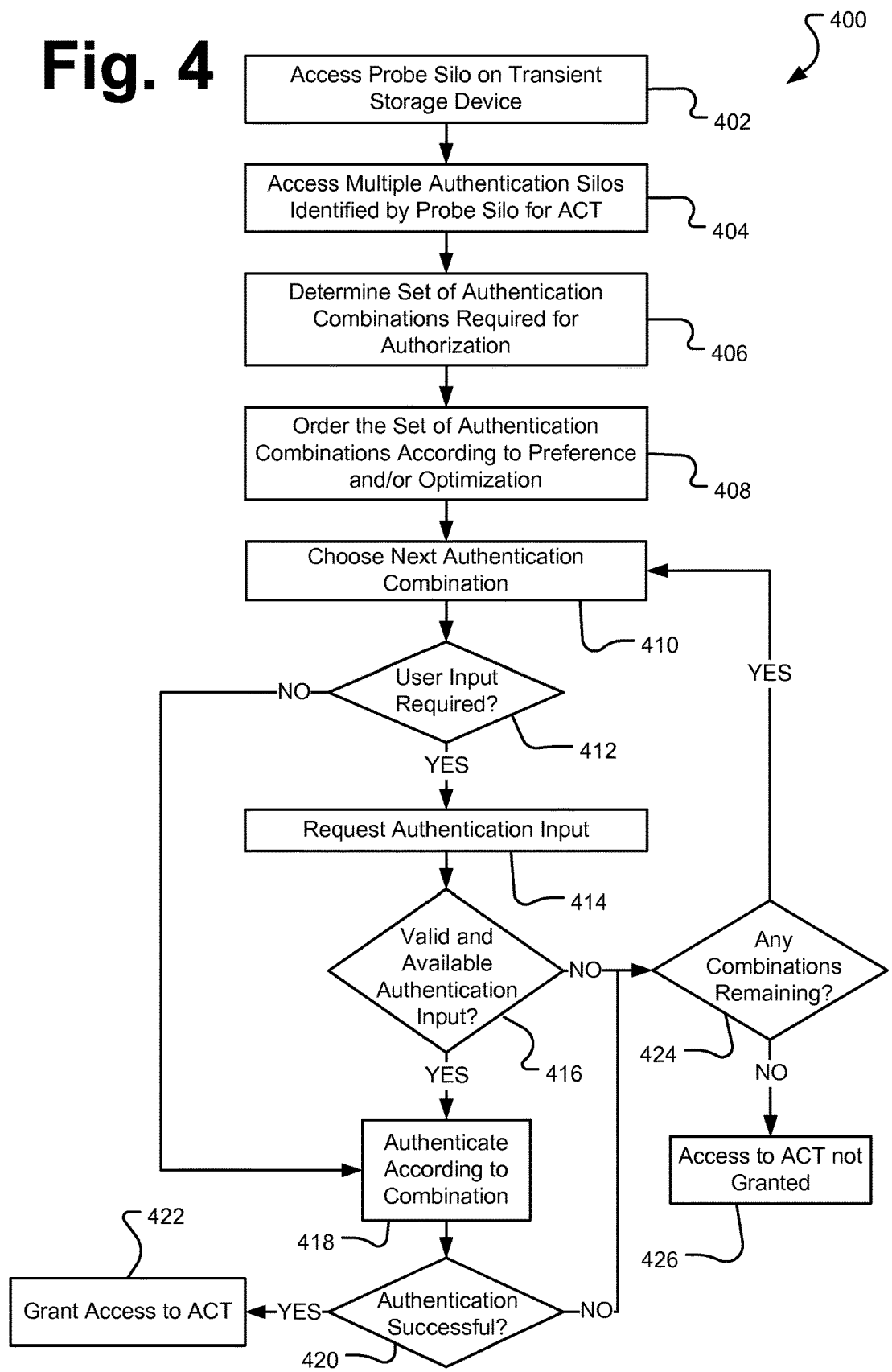

AUTHORIZATION FOR TRANSIENT STORAGE DEVICES WITH MULTIPLE AUTHENTICATION SILOS

CROSS-REFERENCE TO RELATED APPLICATIONS

This application is a divisional of U.S. patent application Ser. No. 12/146,066, filed on Jun. 25, 2008, entitled "AUTHORIZATION FOR TRANSIENT STORAGE DEVICES WITH MULTIPLE AUTHENTICATION SILOS," which issued as U.S. Pat. No. 9,122,895 on Sep. 1, 2015, and which application is expressly incorporated herein by reference in its entirety.

BACKGROUND OF THE INVENTION

Transient storage devices (TSDs) have come into widespread use for portable computer data storage in recent years. TSDs may take the form of universal serial bus (USB) flash drives and memory cards and "sticks" for mobile phones, digital cameras, personal digital assistants, digital music players (e.g., MP3 players), and other portable devices. Because of the large storage capacity of and high speed of data transfer to and from TSDs, security of data transfer to and from host devices to which a TSD may be connected is a recognized concern. The Institute of Electrical and Electronics Engineers (IEEE) 1667 standard for TSDs addresses this concern by including the definition of an authentication data structure (a "silo") for the purpose of storing authentication certificates and subsequent authorization of access to user data on a TSD.

The IEEE 1667 standard allows for devices to have multiple authentication silos which, taken together, govern authorization of access to a single data storage area (an "addressable command target" or ACT) on the TSD storage volume. However, the standard presently only defines one type of authentication silo for certificates and does not suggest what other types of authentication silos could be used. The standard provides no direction with respect to which authentication silo to use in the situation in which more than one authentication silo for an ACT is present or with respect to differing environmental situations of use. Further, the standard lacks a general authentication configuration mechanism for use with multiple silos. An implementation of silo hierarchy and configuration within the constraints of the current IEEE 1667 standard is complicated because the specification provides a limited set of authentication and certificate store management operations as implemented by the certificate silo. However, any configuration solution would need to operate within the parameters and requirements of the current IEEE 1667 standard specification.

BRIEF SUMMARY

In a TSD device with multiple authentication silos, the host computing device connected to the TSD is configured to discover and act upon various types of authentication information in the silos. To grant access to the ACT, one or more logical combinations of authentication silos must be switched to the authenticated state. The host interrogates the TSD for the set of logical combinations of authentication silos that may authorize host access to the TSD. To achieve a valid combination of authenticated silos, a particular ordering of authentication silos may also be required. Ordering may be suggested by configuration information in the TSD. Ordering may also be based upon, for example, whether or not user input is required for authenticating a given authentication silo, the environment of use of the TSD, or a hierarchy from most trusted to least trusted authentication silo.

With this information, the host may then proceed with the most efficient authentication sequence leading to a grant of access to the ACT. Additionally the host may optimize its behavior, for example, such that the host favors silent authentication (no user input) over prompting the user, where possible. The host may also attempt alternate combinations of authentication silos when previous combinations fail. Further, the host may use this information to determine when authorization is not possible given that all combinations of authentication have been exhausted.

Extension fields in a manufacturer certificate and/or in a provisioning certificate in the authentication silo of a TSD are used to provide authentication requirements for access to particular ACTs of the TSDs while operating within the constraints of the current IEEE 1667 standard. In one implementation, values for configurable settings of the TSD are set in extension fields of a manufacturer certificate and/or provisioning certificate. The method takes advantage of properties unique to the IEEE 1667 certificate silo specification and ITU-T X.509 certificate specification in a unique way. The method is implemented while satisfying the security requirements for device configuration and taking advantage of the existing standards definitions as they are, without modification. Among other things, the method allows particular features present in the TSD firmware to be enabled or disabled.

For the purposes of this specification, the terms "transient storage device" and "TSD" encompass any device to which the IEEE 1667 standard may be applied as well as any storage device which may similarly accept the equivalent of a manufacturer certificate and/or provisioning certificate that supports extension fields, for example, advanced technology attachment (ATA) devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTION OF THE DRAWINGS

FIGS. 3A-3D are schematic diagrams depicting exemplary implementations of authentication silos on a transient storage device and optional methods for determining hierarchies and required combinations of authentications for authorization to access the transient storage device.

FIG. 4 is a flow diagram of an implementation of procedure for determining a required authorization scheme for access to a transient storage device with multiple authentication silos.

DETAILED DESCRIPTION

While the IEEE 1667 standard allows for devices to have multiple authentication silos, the only authentication silo presently implemented is a certificate silo. The multiple authentication silos for a particular ACT, taken together, govern authorization of access to a single data storage area. In the future, if additional authentication silos are provided on transient storage devices ("TSDs"), then a scheme for managing conflicts and priorities between multiple and possibly competing authentication silos is desirable.

Figure 1:
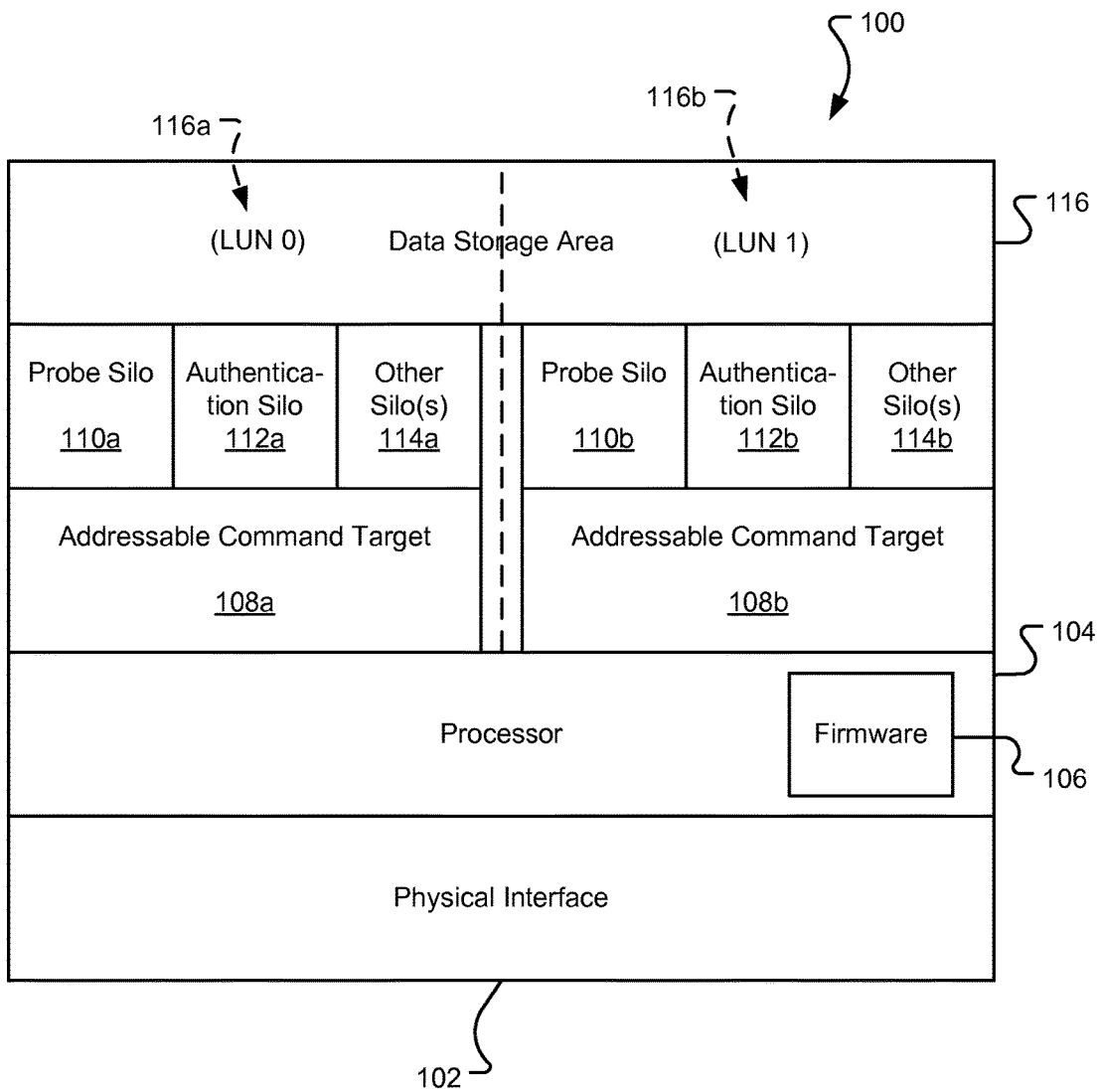
FIG. 1 is a schematic diagram of several protocol layers of a transient storage device indicating one implementation of a possible configuration of the transient storage device.

A transient storage device 100 or TSD is functionally divided into several different components as depicted in FIG. 1. The TSD 100 has a physical interface 102 to allow the TSD 100 to connect and communication with a host device. For example, a universal serial bus (USB) flash drive (UFD) generally has a box-shaped contact interface with 4 additional contact traces positioned on an insulator and surrounded by the rectangular contact. The TSD 100 further includes a processor 104 operating under control of embedded firmware 106 that executes data transfer, host-device mutual authentication, and other functionality of the TSD 100. Each TSD 100 may have at least one and possibly more individually authenticated data storage areas 116 each accessed through an "addressable command target" (ACT) layer, which are similar in concept to "logical units" in other storage systems. FIG. 1 depicts a TSD 100 with a first ACT 108a and a second ACT 108b.

Each ACT 108a, 108b implements several functional units called "silos" in the IEEE 1667 specification including at least a probe silo 110a, 110b and an authentication silo 112a, 112b. Each ACT 108a, 108b may implement additional manufacturer or user defined silos 114a, 114b. The ACT 108a or 108b and the corresponding silos provide configuration and authentication control individual data storage areas addressed as LUN0 or LUN1 corresponding to 116a or 116b on the TSD 100.

The probe silos 110a, 110b are used by the host connected via the physical interface 102 to interrogate the ACTs 108a, 108b and identify the available functional units. The probe silos 108a, 108b in the TSD 100 receive an identification of the operating system and IEEE 1667 versions running or present on the host device. The probe silos 108a, 108b return the number, types, and versions of the silos implemented in each ACT 108a, 108b. Interrogation of the probe silos 110a, 110b occurs before any further action can be taken with respect to any other silo.

Once the probe silos 108a, 108b receive and return the necessary device information, the authentication silos 112a, 112b for each ACT 108a, 108b provide the functions required for bidirectional authentication and administration of the authentication certificates. The authentication silos 112a, 112b use certificates to authenticate the host and each ACT 108a, 108b and also administers the certificates. Each of the probe silos 110a, 110b, the authentication silos 112a, 112b, and the other silos 114a, 114b is specific to a respective ACT 108a, 108b. As a general matter, the data storage area 116 is initially considered a single "logical unit" or ACT under the IEEE 1667 standard and is thus subject as a whole to any manufacturer certificate or provisioning certificate placed in and handled by the original or first authentication silo 112a. However, the first authentication silo 112a may be configured to partition the data storage area 116 into a number of ACTs 108a, 108b with separately accessible storage areas identified for convenience in the construct of disks with logical unit numbers (LUN#), for example, LUN0 116a and LUN1 116b, as shown in FIG. 1. Further, the manufacturer certificate, the provisioning certificate, or both may provide for more than one type of authentication silo for an ACT or each ACT on the TSD 100.

Figure 2:
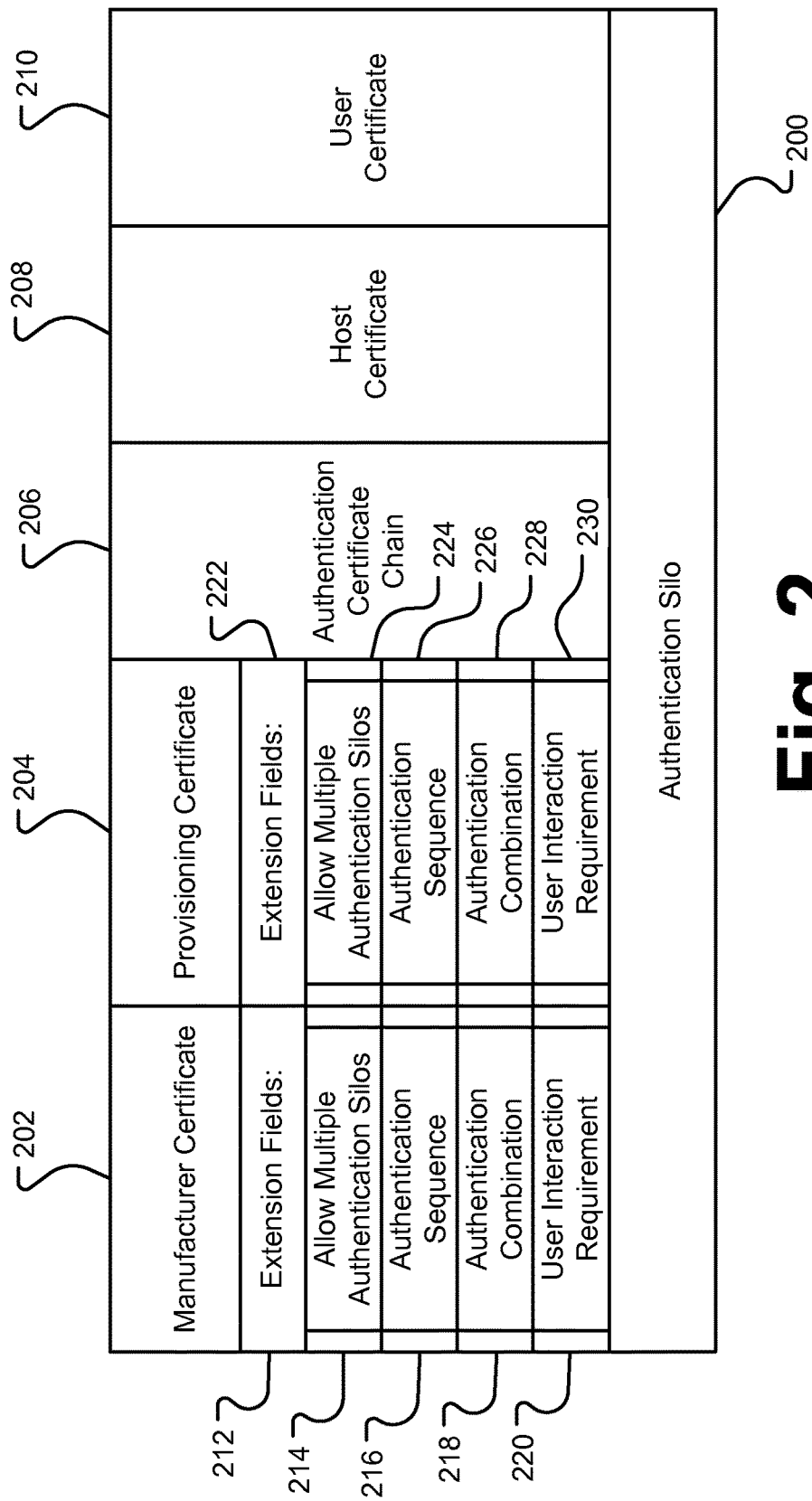
FIG. 2 is a schematic diagram of the authentication silo of a transient storage device and an implementation using extension fields in a manufacturer or provisioning certificate to configure the transient storage device.

A more detailed description of an implementation of functional components of an authentication certificate silo 200 is depicted in FIG. 2. Under the IEEE 1667 standard, five different types of certificates are defined for holding by an authentication certificate silo 200: a manufacturer certificate 202, a provisioning certificate 204, an authentication certificate chain 206, a host certificate 208, and a user certificate 210. The manufacturer certificate 202 is mandatory and attests to the identity of the TSD. The manufacturer certificate 202 includes a unique identifier for the TSD and a public key that can be used to challenge the TSD. The authentication silo 200 of each ACT may each bear a unique manufacturer certificate 202 with a unique public key from a unique key-pair. The requirement, however, is that all manufacturer certificates chain to the same immediate parent manufacturer certificate. The manufacturer certificate for the first ACT on the TSD may be used to enable additional types of authentication silos beyond the default certificate silo 200. Extension fields 212 of the provisioning certificate 204 may be used to specify the details of this new state as further described below.

The provisioning certificate 204 grants administrative access to the authentication silo 200 and provides an administrator the ability to manage the remaining certificates. A user can only add, remove, or replace authentication certificates on a host that has access to a certificate signed by the provisioning certificate 204 stored in the authentication silo 200. The provisioning certificate 204 for the initial ACT is immutable and may be used to create a TSD that re-initializes into a new state containing multiple ACTs as the TSD is provisioned with the initial provisioning certificate 204. Similar to the manufacturer certificate, the initial provisioning certificate for the first ACT on the TSD may be used to enable additional types of authentication silos beyond the default certificate silo 200. Extension fields 212 of the provisioning certificate 204 may be used to specify the details of this new state as further described below. Additional provisioning certificates may be provided specific to additional ACTs created by the initial provisioning certificate 204.

Once the ACT is provisioned, the TSD can store an authentication silo certificate chain 206. Users can use this chain to create personalized devices separate from all other devices with the same manufacturer and product identification numbers. The host can use the contents of the certificate chain 206 to authenticate the ACT and authorize access to storage in the ACT. Use of the certificate chain 206 in the context of the technology disclosed herein is further described below.

The host certificate 208 authenticates the host to the TSD when the TSD is attached. Multiple host certificates 208 may be added to the TSD corresponding to multiple host devices in which the TSD may be authenticated. Under the IEEE 1667 standard, if no host certificate is stored in the authentication silo 200, the TSD may automatically treat the host as authenticated indicating that limiting access to specific hosts is not intended. This simplifies configuration of the TSD when the manufacturer requires host authentication as a prerequisite for data access. The ACT will transition to an authenticated state when the host presents a certificate signed by one of the host certificates in the authentication silo.

User certificates 210 may also be placed in the authentication silo. User certificates 210 are not administered by the authentication silo 200. Under the IEEE 1667 standard any application can store or remove these certificates from the authentication silo 200. No further host certificates 208 or user certificates 210 may be added to the TSD unless the host or user certificate holder successfully authenticates using the provisioning certificate 204 placed on the TSD by the provisioner.

Under the IEEE 1667 standard, before a TSD may be used to provide secure access to data on the storage volume, it must undergo a set of operations that prepare it for that purpose. The IEEE 1667 standard specifies this process as provisioning. The provisioner of a TSD is not necessarily the user of that TSD. The provisioner is in effect the administrator for the TSD and may be the user, a system administrator, or the manufacturer.

In practice, the TSD arrives from the manufacturer in the non-provisioned state, with at least one ACT, the initial ACT(0) containing the authentication silo 200. The first provisioner of this ACT(0) may specify device global settings for the TSD in addition to ACT-specific settings. The global TSD settings are only configurable during first provisioning operation. Once placed on the TSD, the initial provisioning certificate 204 remains in effect and cannot be replaced unless the device is expressly re-initialized (i.e., reset to an original manufacturing state). Thus, once the configuration settings are specified, they can never be changed unless the TSD is reset back the manufactured state. This reset of the provisioning certificate 204 destroys all protected data so this data remains secure and resets any TSD configuration settings back to an initial state as at the time of manufacture. After a successful first provisioning, the TSD may now be in a state that it behaves differently or exposes additional ACTs and/or silos above and beyond the original ones. Further provisioning of other ACTs by other manufacturer and provisioning certificates can never affect the global settings of the TSD set by the initial manufacturer certificate 202 and provisioning certificate 204, only ACT-specific settings. The TSD and the ACTs thereon remain secure due to the initial manufacturer certificate 202 and provisioning certificate 204 constraints.

The autonomous system number ASN.1 data type used to represent certificates following the International Telecommunication Union ITU-T X.509 standard is presented below. This is the format used for the manufacturer certificate 202 and the provisioning certificate 204 of a TSD device according to the IEEE 1667 standard. As indicated, the data type provides for the use of extension fields near the end of the certificates. However, the extensions are deemed optional and are not further defined. Note that to allow for the presence of extension fields in the certificate, the version field must be set to version 3 (v3).

```
Certificate ::= SIGNED { SEQUENCE {
    version [0] Version DEFAULT v1,
    serialNumber CertificateSerialNumber,
    signature AlgorithmIdentifier,
    issuer Name,
    validity Validity,
```

-continued

```
    subject Name,
    subjectPublicKeyInfo SubjectPublicKeyInfo,
    issuerUniqueIdentifier [1] IMPLICIT UniqueIdentifier
OPTIONAL,
        -- if present, version shall be v2 or v3
    subjectUniqueIdentifier [2] IMPLICIT UniqueIdentifier
OPTIONAL,
        -- if present, version shall be v2 or v3
    extensions [3] Extensions OPTIONAL
        -- If present, version shall be v3 -- } }
    Version ::= INTEGER { v1(0), v2(1), v3(2) }
    CertificateSerialNumber ::= INTEGER
AlgorithmIdentifier ::= SEQUENCE {
    algorithm ALGORITHM.&id ({SupportedAlgorithms}),
    parameters ALGORITHM.&Type ({SupportedAlgorithms}{
    @algorithm})
OPTIONAL }
    -- Definition of the following information object set is deferred,
perhaps to standardized
    -- profiles or to protocol implementation conformance statements.
The set is required to
    -- specify a table constraint on the parameters component of
AlgorithmIdentifier.
    -- SupportedAlgorithms ALGORITHM ::= { ... }
Validity ::= SEQUENCE {
    notBefore Time,
    notAfter Time }
SubjectPublicKeyInfo ::= SEQUENCE {
    algorithm AlgorithmIdentifier,
    subjectPublicKey BIT STRING }
Time ::= CHOICE {
    utcTime UTCTime,
    generalizedTime GeneralizedTime }
Extensions ::= SEQUENCE OF Extension
Extension ::= SEQUENCE {
    extnId EXTENSION.&id ({ExtensionSet}),
    critical BOOLEAN DEFAULT FALSE,
    extnValue OCTET STRING
    -- contains a DER encoding of a value of type &ExtnType
    -- for the extension object identified by extnId -- }
ExtensionSet EXTENSION ::= { ... }
```

The present technology leverages the optional extension fields 212 in the manufacturer certificate 202 and/or the extension fields 222 in the provisioning certificate 204 to provide for additional types of authentication silos than certificate silos. While provisioning the TSD, the manufacturer or provisioner may elect to enable or disable various device settings that govern the behavior and performance of the TSD. The manufacturer or provisioner communicates these settings via ITU-T X.509 certificate extension fields 212 in the initial manufacturer certificate 202 and/or the extension fields 222 in the initial provisioning certificate 204. The ACT receives these settings during a set certificate command. The authenticity of these settings can be verified on the TSD by the certificate signature field which will not match the expected value if tampering has occurred.

The provisioner may discover available supported TSD configuration settings by retrieving the manufacturer certificate 202. The manufacturer certificate 202 indicates the set of allowable configuration settings in the extension fields 212 of that certificate. The provisioner may parse these settings to determine which, if any, to include in the extension fields 222 of the provisioner certificate 204 during placement of the provisioning certificate 204 on the TSD. The configuration settings in the extension fields 222 of the provisioning certificate 204 will trump any default settings in the extension fields 212 of the manufacturer certificate 202. The configuration settings in the extension fields 212, 222 are immutable values in that they cannot be changed except by removal of manufacturer certificate 202 or the initial provisioning certificate 204, which results in the erasure of all data and certificates from the TSD.

Exemplary configuration settings that may be placed in the extension fields 212 of the manufacturer certificate 202 are now described. Initially, to provide for the creation of additional types of authentication silos, a multiple authentication silo extension setting 214 may be placed in an extension field 212. This extension setting 214 may be used by the manufacturer or provisioner to configure the TSD to allow additional authentication silos beyond the default certificate authentication silo 200 to be placed within any ACTs on the TSD. Additional authentication silo types may include password silos and bio identification silos. An exemplary multiple authentication silo extension setting 214 for indicating the required logical combination, ordering preference, and user interface requirements for successful authentication when faced with the situation of multiple authentication silos on an ACT using the extension fields 212 of a manufacturer certificate 202 may be as follows:

extnid=urn:oid:
        2.25.329800735698586629295641978511506172922
    critical=00
    extnValue=01, 02, 00, 02, 03, 00, 00, 02, 04, 00, 00, 00, 01, 02, 03, 04, 00, 02, 03, 00 where the first the first string of non-zero terms represent logical "MinTerm" AND combinations of silo index values. (The value 00 may be used as a separator as it is reserved for probe, a non-authenticating silo by definition.) This term is OR combined with the next occurring "MinTerm" combination after 00, etc.

In the example above, the first combination term is (01 AND 02) OR (02 AND 03). The occurrence of 00, 00 denotes the end of one combination. Following this, the next combination begins. In the example above, the next combination is (02 AND 04). A string of 00, 00, 00 denotes the end of the set of combinations. This is then followed by the list of silo indexes indicated in ascending order of preference. The first occurrence of 00 terminates this list, upon which silo indexes requiring user input are listed and again terminated by 00. In the case of an ACT where no user input is ever required, it follows that the sequence 00, 00 immediately follows the silo preference list. Note that instead of the manufacturer certificate 202 configuring this functionality, the extension fields 222 of the provisioning certificate 204 may include a multiple authentication silo extension setting 224 to change the state of the TSD.

An authentication sequence extension setting 216 may be used to configure a logical order for the TSD or host device to interrogate or answer authentication challenges from multiple authentication silos to most efficiently establish authorization to access a particular ACT. The sequence for attempting authentication options among the multiple authentication silos may be the same or may vary depending upon the identity of the host device or other aspects of the operating environment. Note that instead of the manufacturer certificate 202 configuring this functionality, the extension fields 222 of the provisioning certificate 204 may include an authentication sequence extension setting 226 to change the state of the TSD.

Another setting that may be provided is an authentication combination extension setting 218. When multiple authentication silos are used, it may be important to designate which silos must be placed into an authenticated state in order to allow access by a user to an associated ACT. For example, in one implementation although several authentication silos may be provided or supported, authentication of any one of them will allow access. To continue the example, a user may have the correct certificate on her personal host computer which authenticates and authorizes the TSD immediately; however, the user wants to use the TSD on a public host computer without the corresponding certificate and is able to access the TSD by entering a password into to authenticate a separate password silo. If the TSD is configured to accept either a certificate or a password, then access to the user with the correct password will be granted. In an alternative example, if the TSD was configured to require a combination of both a certificate from the host and a password from the user to allow access, in the scenario above the user would not be granted access to the TSD on a public host computer because the required combination of authentication was not available for authorization. Note that instead of the manufacturer certificate 202 configuring this functionality, the extension fields 222 of the provisioning certificate 204 may include an authentication combination extension setting 228 to change the state of the TSD.

Another setting related to authentication silos for placement in an extension field 212 of a manufacturer certificate 202 may be a user interaction requirement extension setting 220 to configure user interaction requirements for the particular silo. This setting may indicate whether the silo requires user input rather than merely a certificate comparison between the TSD and the host in order to change the silo to an authenticated state. For example, the authentication silo may require a password authentication or a facial recognition or other bio-authentication, both of which would require user input to the host device to compare with the corresponding authentication file or related secure hash value stored on the TSD. Alternatively, a certificate authentication silo would not require user input. Note that instead of the manufacturer certificate 202 configuring this functionality, the extension fields 222 of the provisioning certificate 204 may include a user interaction requirement extension setting 230 to change the state of the TSD.

Either the TSD itself, or a software agent for the TSD operating on the host device (e.g., in the form of software or a device-specific configuration file), or a combination of the two, may bear one or more "authorization policy expressions" (APE) based upon the configuration settings for multiple authentication silos in the extension fields of the manufacturer certificate or the provisioning certificate. An APE may include one or more of the following components:

- a string expression containing an ordered list of silo identifications ranked according to an authentication sequence order;
- a logical expression for authentication combination (e.g., composed of MaxTerms/MinTerms as described below) such that when the corresponding authentication silos are in the authenticated state, authorized access to the ACT is granted to the host device by the TSD; and
- a string expression indicating which authentication silos require user interaction.

The host device uses information in the APE to calculate the most efficient path to place the ACT in an authorized state. Any possible logical combination and sequence of authentication silos may be accommodated. The APE may also provide the host device with guidance to optimize and govern the authentication and authorization process while taking enforcement of group policy into consideration.

A group of exemplary authentication silos is presented in FIG. 3A. Authentication silo A is depicted as a default certificate silo 302. Authentication silo B is depicted as a password silo 304 that is authenticated upon presentation of user input of a correct password from the host device. The password silo 304 may accommodate multiple users of the TSD by requesting a user name to be correlated to specific passwords or it may merely authenticate any of multiple passwords that it has been configured to accept.

Authentication silo C is depicted as a fingerprint silo 306 that is authenticated upon presentation of user input of a fingerprint reader attached to a host device. A hash of the input fingerprint may be compared to a hash stored on the fingerprint silo 306 to perform the authentication. The fingerprint silo 306 may accommodate multiple users of the TSD by requesting a user name to be correlated to a specific fingerprint hash or it may merely authenticate any of multiple fingerprints that it has been configured to accept.

Authentication silo D is depicted as a voiceprint silo 308 that is authenticated upon presentation of user input of a voiceprint reader attached to a host device. A hash of the input voiceprint may be compared to a hash stored on the voiceprint silo 308 to perform the authentication. The voiceprint silo 308 may accommodate multiple users of the TSD by requesting a user name to be correlated to a specific voiceprint hash or it may merely authenticate any of multiple voiceprints that it has been configured to accept.

Authentication silo E is depicted as an optical scan silo 310 that is authenticated upon presentation of user input of a retinal scan in an optical reader attached to a host device. A hash of the input retinal scan may be compared to a hash stored on the optical scan silo 310 to perform the authentication. The voiceprint silo 310 may accommodate multiple users of the TSD by requesting a user name to be correlated to a specific retinal scan hash or it may merely authenticate any of multiple retinal scans that it has been configured to accept.

FIG. 3B schematically depicts an exemplary string expression containing an ordered list of silo identifications ranked according to an authentication sequence order. Silo B is ranked first as the preferred authentication method. Therefore, in this case, the host device would be directed by the APE to attempt to authenticate using silo B first. In the example of FIG. 3A, this would mean that the host device would seek user input in the form of a password and present the password to Silo B to authenticate the host to the device before trying any of the other authentication silos. As depicted, Silo C is ranked second, Silo D is ranked third, Silo E is ranked fourth, and Silo A is ranked fifth in a preferred sequence of authentication. The host device would attempt authorizations to silos in this order pursuant to the APE. However, the host device is able to make determinations (e.g., based upon operating environment) to expedite the authentication process. For example, should a particular user input not be available (e.g., the host device is not equipped with a keyboard or a fingerprint reader as in FIG. 3A), the host device may recognize this fact and skip directly to soliciting user voiceprint input for authentication.

FIG. 3C schematically depicts one exemplary implementation of a logical expression for an authentication combination such that when the corresponding authentication silos are in the authenticated state, authorized access to the ACT is granted to the host device by the TSD. In this example, the TSD may be understood as requiring extremely high security to provide access authorization to an ACT. In this case, the APE requires a combination of both a certificate (Silo A), a password (Silo B), and either a fingerprint match (Silo C) or a voiceprint match (Silo D) in combination with the certificate and password in order to authorize access to the ACT on the TSD. Alternatively, because of greater reliability of an optical retinal scan (Silo E) (e.g., either in accuracy or known security of environment of the optical reader), this authentication alone would allow access to the ACT on the TSD.

FIG. 3D schematically depicts an alternate exemplary implementation of a logical expression for an authentication combination using a MaxTerms/MinTerms construct such that when the corresponding authentication silos are in the authenticated state, authorized access to the ACT is granted to the host device by the TSD. As shown in FIG. 3D, access to the ACT on the TSD may be authorized if a certificate authorization (Silo A) is accompanied by any of a password authentication (Silo B), a fingerprint authentication (Silo C), or a voiceprint authentication (Silo D). Alternatively, the provision of an optical scan authentication (Silo E) alone will authorize access.

The TSD (or the host device pursuant to the APE) may determine if any of these particular combinations is present by performing a standard MaxTerms/MinTerms comparison. The minimum terms are the combinations of Silos A and B, Silos A and C, Silos A and D, and Silo E. If any of the silos is authenticated, then its state may be represented by a 1. If a silo is not authenticated, then its state may be represented by a 0. The combination of these state values into a MinTerm operator is performed by multiplying the state values together. Thus, if one state term is 0, the MinTerm will be 0; if both state terms are 1, the MinTerm will be 1 for that combination. As long as the Maxterm, which is the sum of all MinTerm combinations, is greater than 0, then there is appropriate authentication and authorization. If all the MinTerms are 0, then the MaxTerm will be 0 and access to the ACT will be denied. If any MinTerm is greater than 0, then the MaxTerm will be greater than 0 and access to the ACT will be granted.

An exemplary authentication process 400 to authorize access to ACT for a user of a TSD in an environment with multiple authentication silos is presented in FIG. 4. In an accessing operation 402, the probe silo on a TSD is accessed by a host to interrogate the probe silo for numbers, types, and versions of silos. The host simultaneously provides operating system and IEEE 1667 version information particular to the host device. Using the silo information, the host next accesses the authentication silo(s) based upon the identification information provided by the probe silo in a second accessing operation 404. If the probe silo indicates that there is more than one authentication silo for a particular ACT, an the APE may be constructed to assist in the authentication process 400 to coordinate the authentication requirements and report the states of the authentication silos to determine whether the collective state required for access authorization has been achieved. The process 400 next determines pursuant to the APE whether there is a combination of authentications required for authorization as indicated in first determination operation 406. The process 400 further determines a logical sequence or order for authentication of a logical combination of multiple silos according to device preference or host optimization determination in operation 408. The first occurring logical combination of authentication silos according to preference and/or host optimization is chosen in operation 410.

The APE may further provide information regarding whether particular authentication silos require user input. For the first authentication silo in the sequence, the process 400 queries whether user input is required to authenticate the silo in query operation 412. If no user input is required, the process moves to authentication operation 418 to attempt to authenticate automatic authentication combinations (e.g., certificates provided by the host device). The process 400 moves to query operation 420 to determine whether the combination of authentications has resulted in a successful grant of overall authentication required by the TSD for authorized access to the ACT. If the required authentication combinations have been met, the host will be authorized and access to the ACT will be granted as indicated in granting operation 422.

Returning to the user input query operation 412, if user input (e.g., a password or bio-authentication) is required, the host device will request the required user input in request operation 414. The host device then determines whether the requested input information is available in query operation 416. If the host device determines that the requested user input is not available (e.g., the host device is not connected to a particular input interface device) or that no user input has been supplied after a reasonable period of time, then the process 400 determines whether any further logical combinations remain that may be tried as part of the query operation 424. If no further combinations remain, the host terminates any further authentication attempts as indicated in operation 426. However, if more combinations do remain, the next combination is chosen as the process 400 returns to operation 410 to select the next available combination.

Alternatively, if query operation 416 determines that the user input is available and appropriate, then the process moves to operation 418 where the user input together with other necessary data is used in an attempt to authenticate the logical combination of ACTs. The process 400 then moves to query operation 420 to determine whether any required combination of authentications has been met. If the authentication states of the authentication silos collectively result in achieving the required authentication combinations, the host will be authorized and access to the ACT will be granted as indicated in granting operation 420.

Alternatively, if either query operation 416 determines that the authentication certificate or input received is invalid or query operation 420 determines that the required combination of authenticated silos has not been met, then the process 400 determines whether any logical combinations remain to be attempted in query operation 424. If no further combinations remain, no further attempts to authenticate for access to the ACT will be made as indicated in operation 426. Alternately, if further combinations are available, then the process 400 may select the next combination of authentication silos for attempted authentication as indicated in choosing operation 410 and attempt to authorize the host device to the TSD as previously described.

Figure 5:
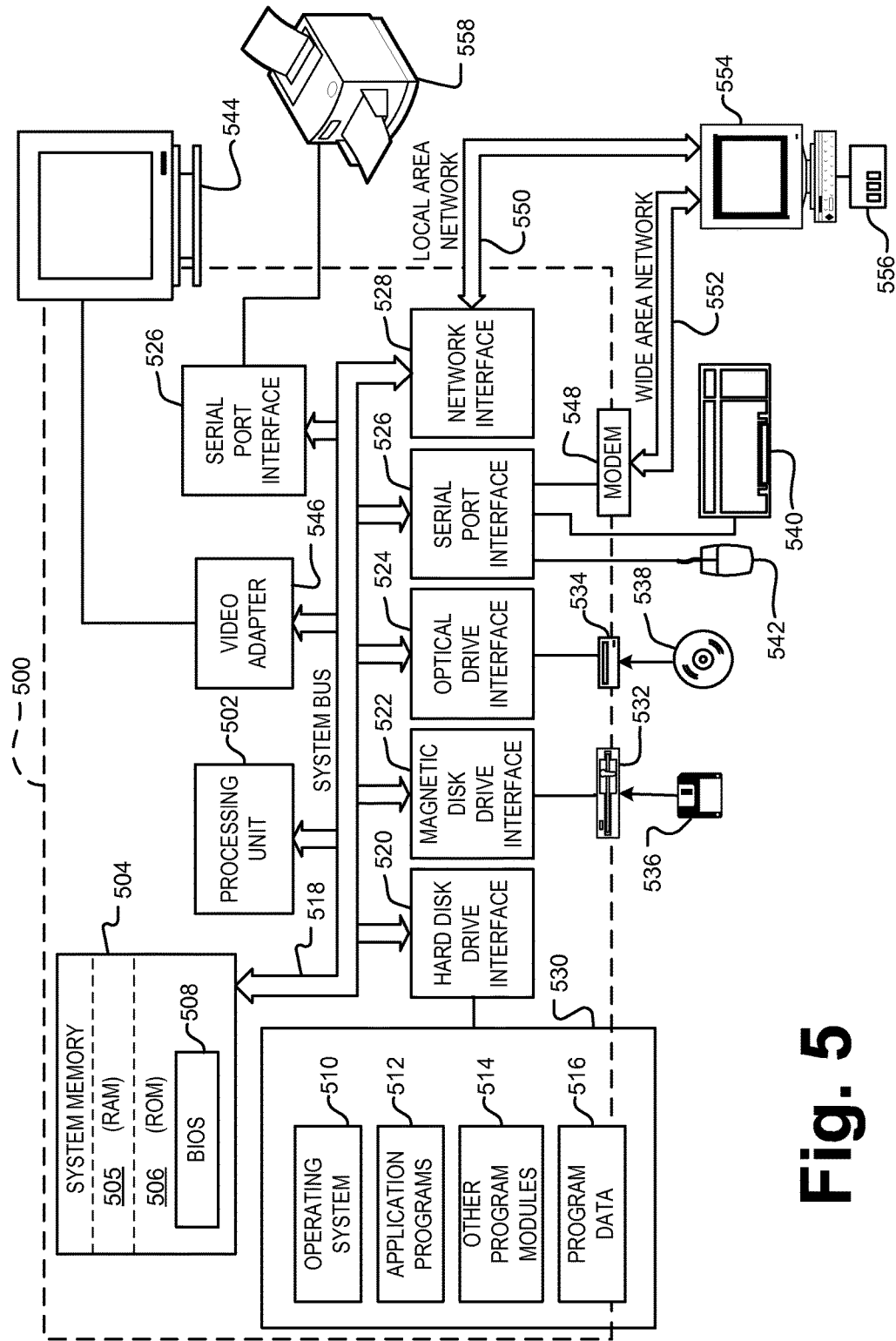
FIG. 5 is a schematic diagram of a general purpose computer system that may operate as a host device for a transient storage device.

A schematic diagram of a general purpose computing device 500 that may operate as a host computer device to a TSD is depicted in FIG. 5. The exemplary hardware and operating environment for the host computing device may include a processing unit 502, a system memory 504, and a system bus 518 that operatively couples various system components, including the system memory 504 to the processing unit 502. There may be one or more processing units 502, such that the processor of computer 500 comprises a single central processing unit (CPU), or a plurality of processing units, commonly referred to as a parallel processing environment. The computer 500 may be a conventional computer, a distributed computer, or any other type of computer.

The system bus 518 may be any of several types of bus structures including a memory bus or memory controller, a peripheral bus, a switched fabric, point-to-point connections, and a local bus using any of a variety of bus architectures. The system memory 504 may also be referred to as simply the memory and includes read only memory (ROM) 506 and random access memory (RAM) 505. A basic input/output system (BIOS) 508, containing the basic routines that help to transfer information between elements within the computer 500, such as during start-up, is stored in ROM 506. The computer 500 further includes a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM or other optical media.

The hard disk drive 530, magnetic disk drive 532, and optical disk drive 534 are connected to the system bus 518 by a hard disk drive interface 520, a magnetic disk drive interface 522, and an optical disk drive interface 524, respectively. The drives and their associated computer-readable media provide nonvolatile storage of computer-readable instructions, data structures, program modules and other data for the computer 500. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 530, magnetic disk 532, optical disk 534, ROM 506, or RAM 505, including an operating system 510, one or more application programs 512, other program modules 514, and program data 516. In an exemplary implementation, programs for communication and data transfer with the TSD may be incorporated as part of the operating system 510 (e.g., as part of an application protocol interface (API)), application programs 512, or other program modules 514 (e.g., modules that process the APE during authentication processes).

A user may enter commands and information into the personal computer 500 through input devices such as a keyboard 540 and pointing device 542, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 502 through a serial port interface 526 that is coupled to the system bus 518, but may be connected by other interfaces, such as a parallel port, game port, or a universal serial bus (USB).

A monitor 544 or other type of display device is also connected to the system bus 518 via an interface, such as a video adapter 546. In addition to the monitor 544, computers typically include other peripheral output devices, such as a printer 558 and speakers (not shown). These and other output devices are often connected to the processing unit 502 through the serial port interface 526 that is coupled to the system bus 518, but may be connected by other interfaces, such as a parallel port, game port, or a universal serial bus (USB). A media tuner module 560 may also be connected to the system bus 518 to tune audio and video programming (e.g., TV programming) for output through the video adapter 546 or other presentation output modules.

The computer 500 may operate in a networked environment using logical connections to one or more remote computers, such as remote computer 554. These logical connections may be achieved by a communication device coupled to or integral with the computer 500; the invention is not limited to a particular type of communications device. The remote computer 554 may be another computer, a server, a router, a network personal computer, a client, a peer device, or other common network node, and typically includes many or all of the elements described above relative to the computer 500, although only a memory storage device 556 has been illustrated in FIG. 5. The logical connections depicted in FIG. 5 include a local-area network (LAN) 550 and a wide-area network (WAN) 552. Such networking environments are commonplace in office networks, enterprise-wide computer networks, intranets and the Internet, which are all types of networks.

When used in a LAN 550 environment, the computer 500 may be connected to the local network 550 through a network interface or adapter 528, e.g., Ethernet or other communications interfaces. When used in a WAN 552 environment, the computer 500 typically includes a modem 548, a network adapter, or any other type of communications device for establishing communications over the wide area network 552. The modem 548, which may be internal or external, is connected to the system bus 518 via the serial port interface 526. In a networked environment, program modules depicted relative to the personal computer 500, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products. In one implementation, a computer program product is provided as a computer-readable medium storing encoded computer program instructions executable by a computer system. Another implementation of a computer program product may be provided in a computer data signal embodied in a carrier wave by a computing system and encoding the computer program. Other implementations are also described and recited herein.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A transient storage device (TSD) comprising:
a physical interface;
a processor that operates under the control of firmware embedded in the transient storage device;
a data storage area divided into one or more individually addressable command targets (ACTs);
each of the one or more ACTs having an associated plurality of silos, each associated plurality of silos including a probe silo which exchanges device configuration information with a host and an authentication silo which provides one or more authentication certificates to the host;
the each authentication silo comprising at least one of a manufacturers certificate and a provisioning certificate, wherein the at least one of a manufacturers certificate and a provisioning certificate comprises a multiple authentication silo extension setting and one or more of an authentication sequence extension setting, an authentication combination extension setting, and a user interaction requirement extension setting, such that:
each associated plurality of silos also including at least a first authentication requirement for a first authentication silo corresponding to the data storage area and a second authentication requirement for a second authentication silo corresponding to the data storage area, both the first and second authentication requirements being included in a logical expression, the logical expression comprising one or more authentication silo combinations, at least one combination comprising both the first and second authentication requirements, and the logical expression, when the one or more authentication silo combinations are authenticated in the combinations specified in the logical expression, determining when access to the associated ACT is granted; and
each associated plurality of silos also including a stored authentication sequence order that specifies an order for attempting authentication of the at least first authentication silo and the second authentication silo, the sequence order applied based upon an operating environment of the host.

2. The transient storage device of claim 1, wherein the stored authentication sequence order includes a plurality of ranked authentication methods.

3. The transient storage device of claim 1, wherein the stored authentication sequence order is different for different hosts having different configurations.

4. The transient storage device of claim 1, wherein the stored authentication sequence order specifies a required use of one or more different authentication methods for different host devices, including use of one or more of an iris scanner, a fingerprint scanner, an IR camera, a keyboard or a smart card.

5. The transient storage device of claim 1, wherein the stored authentication sequence order is different for different operating environments.

6. The transient storage device of claim 1, wherein the stored authentication sequence order specifies a required use of one or more different authentication methods for different operating environments.

7. The transient storage device of claim 1, wherein the stored authentication sequence order is different for different users.

8. The transient storage device of claim 1, wherein the stored authentication sequence order specifies a required use of one or more different authentication methods for different users.

9. The transient storage device of claim 1, wherein the plurality of silos further include an extension field that specifies when bio-authentication is required, rather than relying on a certificate requirement to specify when the bio-authentication is required.

10. The transient storage device of claim 1, wherein the plurality of silos further include an extension field that specifies when a password is required, rather than relying on a certificate requirement to specify when the password is required.

11. The transient storage device of claim 1, wherein the transient storage device calculates whether the stored authentication sequence order is met by the host.

12. The transient storage device of claim 1, wherein the one or more individually addressable command targets comprises a plurality of individually accessible command targets.

13. The transient storage device of claim 1, wherein the transient storage device comprises one or more of a universal serial bus (USB) attached storage device, a flash drive, a memory card, or a memory stick.

14. A computer-implemented method, the method performed by executing computer-executable instructions upon one or more computer processors, the method comprising:
for a data storage area divided into one or more individually addressable command targets (ACTs), each of the one or more ACTs having an associated plurality of authentication silos, each authentication silo comprising at least one of a manufacturers certificate and a provisioning certificate, wherein the at least one of a manufacturers certificate and a provisioning certificate comprises a multiple authentication silo extension setting and one or more of an authentication sequence extension setting, an authentication combination extension setting, and a user interaction requirement extension setting:
coordinating a first authentication requirement for a first authentication silo corresponding to the storage area and a second authentication requirement for a second authentication silo corresponding to the storage area;
creating a logical expression comprising one or more authentication silo combinations, at least one combination comprising at least the first and second authentication silos and the first and second authentication requirements such that the first and second authentication silos being authenticated in the combinations specified in the logical expression determine when access to an associated ACT of the storage area is granted; and
specifying an authentication sequence order for attempting authentication of the first authentication silo and the second authentication silo by applying the first and second authentication requirements in the specified sequence order based upon evaluating an operating environment of a host device to determine a desired authentication process.

15. The computer-implemented method of claim 14, wherein the method further includes creating the first authentication silo and the second authentication silo from the storage area.

16. The computer-implemented method of claim 14, wherein the method further includes:
setting values for configurable settings of the storage area in one or more extension fields of an authentication certificate; and
installing the authentication certificate on the storage device.

17. The computer-implemented method of claim 14, wherein the method further includes:
determining whether authentication of at least one authentication silo utilizes user input; and
soliciting user input to meet an authentication requirement.

18. The computer-implemented method of claim 14, wherein the method further includes:
determining whether the authentication sequence order is met.

19. A computer program product comprising one or more hardware storage devices having stored thereon computer-executable instructions configured to coordinate authentication, the computer-executable instructions executable by a one or more processors to:
access one or more individually addressable command targets (ACTs), each of the one or more ACTs having an associated plurality of authentication silos, each authentication silo comprising at least one of a manufacturers certificate and a provisioning certificate, wherein the at least one of a manufacturers certificate and a provisioning certificate comprises a multiple authentication silo extension setting and one or more of an authentication sequence extension setting, an authentication combination extension setting, and a user interaction requirement extension setting;
create a logical expression comprising one or more authentication silo combinations, the logical expression comprising a first authentication silo and a second authentication silo and at least one combination comprising both the first and second authentication silos, the logical expression based on first authentication requirement for the first authentication silo corresponding to a storage area and a second authentication requirement for the second authentication silo corresponding to the storage area such that the first and second authentication silos being authenticated in the combinations specified in the logical expression determine when access to the storage area is granted; and
determine a desired authentication process, the desired authentication process comprising an authentication sequence order for attempting authentication of the first authentication silo and the second authentication silo by applying the first and second authentication requirements in the specified sequence order, the desired authentication process being determined based upon an evaluation of an operating environment of a host device.

20. The computer program product of claim 19, wherein the computer-executable instructions are further executable to:
determine whether a combination of the first and second authentication requirement and the authentication sequence order is met by a host system that is attempting access to the storage area.

* * * * *